Nov. 15, 1932.  W. NOBLE  1,887,876

COUPLING

Original Filed March 10, 1927

Inventor
Warren Noble
By
Attorney

Patented Nov. 15, 1932

1,887,876

UNITED STATES PATENT OFFICE

WARREN NOBLE, OF DETROIT, MICHIGAN

COUPLING

Application filed March 10, 1927, Serial No. 174,293. Renewed March 29, 1932.

In connection with shafts requiring relative rotary adjustment as in the case of a magneto drive, it is often very desirable that a simple easily assembled and rotary adjustable coupling be provided, and the present invention has reference to such a device which combines efficient security with the aforesaid features.

The invention also contemplates facilitating assembling of the driving and driven parts of the coupling to the respective shafts.

Further, the said invention has for its object to provide a coupling sleeve of flexible material particularly adapted to withstand torsional strain although affording a desirable degree of flexibility in the coupling.

Still further objects or advantages subsidiary or incidental to the aforesaid objects, or resulting from the construction or operation of the invention as it may be carried into effect, will become apparent as the said invention is hereinafter further disclosed.

In carrying the invention into effect, I may provide a pair of coupling members for opposed shaft ends, one of which carries a rotatable collar and the other a non-rotatable sleeve of flexible material annularly reinforced to withstand torsional strains, said rotatable collar being adapted to non-rotatable engagement with said flexible sleeve, and a key axially movable within said rotatable sleeve on an axis inclined to that of said sleeve, said key being provided with an adjusting draw nut whereby it may be drawn along its axis into binding engagement between said collar and the coupling on which the collar is mounted to lock said collar against rotation. All of which is more particularly described and ascertained hereinafter, by way of example, having reference to the accompanying drawing, wherein:—

Similar characters of reference indicate similar parts in the several figures of the drawing.

Figure 1:
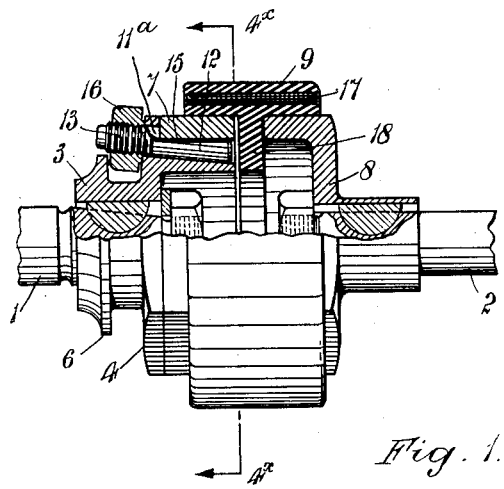
Figure 1 is a side elevation partly broken away and in section of a coupling embodying the said invention.
Figure 4:
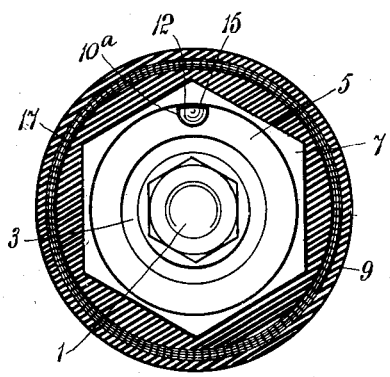
Figure 4 is a section through Figure 1 taken on the line 4x—4x.
Figure 2:
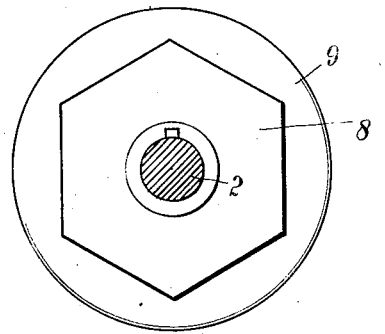
Figure 2 is an end elevation of the same.
Figure 3:
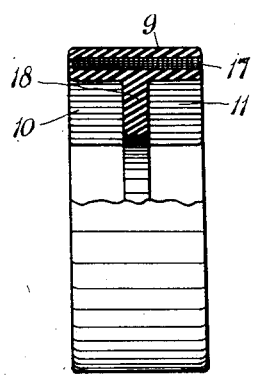
Figure 3 is a side elevation partly broken away and in section of the flexible sleeve of the coupling.
Figure 5:
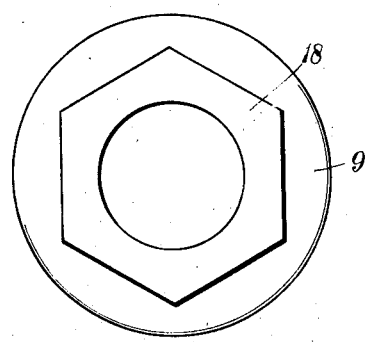
Figure 5 is an end elevation of the flexible sleeve of the coupling.
Figure 6:
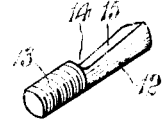
Figure 6 is a detail perspective view of the locking key.

1 and 2 indicate opposed shafts which may however have slight disalignment or be subject to slight disalignment when in operation. Keyed on the shaft 1 is a coupling member 3, the body 4 of which includes a barrel 5 of cylindrical form. The said coupling member 3 is also provided with a flange or abutment 6 spaced from the back of the body of the said member. 7 is a collar rotatable on the cylindrical barrel 5 of the said coupling member, this collar having a hexagonal external configuration.

Keyed to the shaft 2 is a second coupling member 8 the body of which is also of hexagonal external configuration, and the collar 7 and coupling member 8 are coupled together by a flexible sleeve 9 having interior surfaces 10 and 11 in counterpart the hexagonal form of the said collar 7 and member 8 whereby a driving relation exists between the collar 7, sleeve 9 and member 8.

When the parts are assembled together in the manner shown in Figure 1 it will be obvious that the shaft 2 with the coupling member 8, flexible sleeve 9 and collar 7 may be rotated as a unit relative to the shaft 1, or vice-versa, to obtain any rotary adjustment between the two shafts which may be required.

The barrel 5 of the coupling member 3 has a keyway 10ª cut therein at an angle to the axis of the member, said keyway being continued through the back of the member in the form of an opening 11ª to accommodate a key 12 the axis of which is inclined towards a point in the axis of said member 3 in advance thereof.

The said key has a threaded stem 13 which projects rearwardly of the coupling member 3 and the key is cut away at 14 to conform to the periphery of the barrel 5. Movement of the said key forwardly causes its surface 15 to drop below the periphery of the said barrel 5 due to the inclination of the keyway, as will be readily understood, and movement of the key in the opposite direction will bring the said surface 15 into wedging contact with the inner surface of the collar 7.

To provide such rearward movement of the key 12 an operating nut 16 is mounted on the threaded stem thereof and snared between the back of the coupling member body and the abutment 6. By turning the said nut in the required direction the key may be brought into firm engagement with the collar 7 thereby locking it firmly against further rotation after the relative adjustment of the shaft has been satisfactorily made. Turning the nut in the opposite direction to a sufficient extent will relieve the key from its engagement with the collar when further shaft adjustment of the shaft is desired.

It will be obvious that the keyway also may be relieved by simply loosening the nut 16 and then tapping the stem of the key to drive it forward in the keyway.

Re-inforcement in the flexible sleeve 9 is secured by embedding therein a ring of flexible but inelastic material 17, which may be fabric. This re-inforcing material, being in the form of a ring, and not following the hexagonal contour of the internal face of the sleeve, is favorably disposed to resist torsional stresses set up in the sleeve when in operation and to, therefore, maintain the correct rotary relation of the shafts to which they have been adjusted in the manner already described.

A satisfactory method of securing a proper disposition of the re-inforcing material in the sleeve, in the course of manufacture, is to build up the hexagonal core of the mold for the sleeve with rubber compound into a cylindrical form by applying said compound to the flats of the core to the extent required. The fabric or other material is then wound or positioned around such built up core, and the balance of the mold thereafter filled with rubber compound, after which the usual curing operations are resorted to.

18 is an internal web on the flexible sleeve 9, which web enters between the collar 7 and coupling member 8 and prevents undue endwise movement of the said sleeve.

This invention may be developed within the scope of the following claims without departing from the essential features of the said invention, and it is desired that the specifications and drawing be read as being merely illustrative and not in a limiting sense, except as necessitated by the prior art.

What I claim is:—

1. A coupling device of the type described, comprising a coupling member including a cylindrical body and a collar rotatable thereon, a second coupling member, a flexible sleeve connecting said first-named coupling member to said second coupling member, and locking means for securing said collar of said first coupling member against rotation relative thereto.

2. A coupling device of the type described, comprising a coupling member having a relatively rotatable coupling portion the periphery of which portion is out-of-round, a second coupling member having a fixed coupling portion which is also out-of-round, a flexible sleeve, of internal configuration corresponding to the out-of-round shape of said coupling members, connecting said coupling members together, and locking means for securing the rotatable portion of such first coupling member against rotation relative thereto.

3. A coupling according to claim 2, wherein said flexible sleeve is annularly re-inforced to minimize annular elasticity therein.

4. A coupling device for connecting substantially aligned shafts, comprising coupling members for each shaft, one of said members including a body portion and another portion rotatable thereon and adjustable therewith, a connecting sleeve capable of endwise slidable engagement with said members, and means lying substantially parallel to the axis of said shafts for locking the rotatable portion of said first mentioned member in rotated adjustment thereon.

5. In a coupling for two substantially aligned shafts, a member keyed to one shaft, a second member keyed to the other shaft, a collar around one of said members rotatably adjustable therewith to any desired degree, flexible means connecting said collar and said other member to form a driving connection between said shafts and means associated with said flexible means for resisting distortion thereof.

6. In a coupling for two substantially aligned shafts, a member keyed to one shaft having a polygonal exterior surface, a member keyed to the other shaft having a cylindrical exterior surface, a collar fitting over said cylindrical surface having an exterior surface substantially the counterpart of the polygonal surface of said other member, means for locking said collar on said cylindrical member and flexible means overlying said polygonal surfaces whereby a driving connection is formed between said shafts.

7. In a coupling for two substantially aligned shafts, a member keyed to one shaft having a polygonal exterior surface, a member keyed to the other shaft having a cylindrical exterior surface, a collar fitting over said cylindrical surface having an exterior surface substantially the counterpart of the polygonal surface of said other member, means for locking said collar on said cylindrical member, flexible means overlying said polygonal surfaces to form a flexible driving connection between said shafts and means associated with said flexible connection for resisting distortion thereof.

8. The combination as set forth in claim 7, wherein said last named means comprises fabric embedded in said flexible means.

9. In a coupling for two substantially aligned shafts, a member keyed to one of said shafts having an out-of-round exterior configuration, a second member keyed to the other of said shafts having a cylindrical exterior configuration, a cylindrical collar fitting over said second member and having an out-of-round exterior configuration the counterpart of the exterior configuration of said first member, a keyway in said second member, a key in said keyway for frictionally locking said second member and said collar in any desired arcuate position, flexible means engaging both out-of-round surfaces whereby a driving connection is formed between said shafts and means embedded in said flexible means for resisting distortion thereof.

In testimony whereof I affix my signature.
WARREN NOBLE.